(12) United States Patent
Harada et al.

(10) Patent No.: US 7,725,908 B2
(45) Date of Patent: May 25, 2010

(54) OPTICAL DISK APPARATUS

(75) Inventors: Nozomu Harada, Kawasaki (JP); Shinsuke Takatsuka, Hitachinaka (JP); Yosuke Ishizuka, Kawasaki (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 607 days.

(21) Appl. No.: 11/712,070

(22) Filed: Feb. 27, 2007

(65) Prior Publication Data
US 2008/0082993 A1    Apr. 3, 2008

(30) Foreign Application Priority Data
Sep. 28, 2006   (JP) .............................. 2006-264703

(51) Int. Cl.
*G11B 17/03* (2006.01)
(52) U.S. Cl. ...................................... 720/610
(58) Field of Classification Search .................. None
See application file for complete search history.

(56) References Cited

U.S. PATENT DOCUMENTS

| 5,677,898 | A  | * | 10/1997 | Hasegawa et al. | ........ | 369/30.66 |
| 6,118,751 | A  | * | 9/2000  | Hanakawa et al. | ........ | 369/30.74 |
| 6,215,760 | B1 | * | 4/2001  | Hanakawa et al. | .......... | 720/733 |
| 7,365,946 | B2 | * | 4/2008  | Nakamura et al. | ........ | 360/255.2 |

FOREIGN PATENT DOCUMENTS

| JP | 08-235717 | 9/1996 |
| JP | 2004-234800 | 8/2004 |
| JP | 2004-303289 | 10/2004 |
| JP | 2006-120190 | 5/2006 |
| JP | 2006-190350 | 7/2006 |

\* cited by examiner

*Primary Examiner*—Allen T Cao
(74) *Attorney, Agent, or Firm*—Townsend and Townsend and Crew LLP

(57) ABSTRACT

In an optical disk apparatus, an ejection lock mechanism includes three (3) arm portions; i.e., a lock arm for locking a tray, being engaged with a lock member provided on a housing, a drive arm, in contact with the lock arm, for moving the lock arm to a position of being engaged with or releasing from engagement with the lock member, a solenoid having a movable plunger to be engaged with the drive arm, and a reset arm for restoring the plunger of the solenoid, wherein the reset arm is made up with an arm portion and an elastic portion, which are formed in one (1) body (as a unit) from a plastic, and the arm portion has two (2) arm pieces, and wherein a first arm piece has a function for moving the drive arm to the position of releasing from engagement with the lock member, through rotation thereof while being in contact with the lock member, and a second arm piece has a function for restoring the drive arm to a plunger storing portion of the solenoid, with a biasing force of the elastic portion, and the elastic portion has the "U"-shaped portions, turning round to the reset arm through an upper portion of the drive arm, whereby rotation of the first arm piece in contact with the lock member makes a mutual distance between the "U"-shaped portions, so as to maintain stability on the spring biasing force thereof.

3 Claims, 10 Drawing Sheets

OPTICAL DISK APPARATUS

BACKGROUND OF THE INVENTION

The present invention relates to an optical disk apparatus of using a tray therein (i.e., of a tray type), and it relates to, in particular, an ejection lock mechanism in such the optical disk apparatus.

Many of the optical disk apparatuses, which are installed within a notebook type personal computer, adopt so-called a tray type, having a disk tray for loading an optical disk thereon being freely movable in/out a housing thereof. With such the apparatus, in particular, when loading the optical disk thereon, the tray is pulled out from the housing, so as to attach (i.e., load) the optical disk thereon, and is pulled back into the housing, thereby to start driving of the disk.

The tray-method optical disk of such the conventional art, in general, adopts the structures, wherein that tray is taken out/in from an opening formed on the housing, which is constructed by combining a top case and a bottom case. Further, on the tray are mounted a disk motor for rotationally driving the optical disk, an optical pickup for irradiating a laser beam upon the optical disk, thereby recording/reproducing a signal thereon/from, an optical pickup transmission mechanism for moving the optical pickup in a radial direction of the optical disk, and an ejection lock mechanism for locking the tray at an insertion position within the housing of the apparatus, etc., and, on both sides of that tray are rails for guiding the tray to be inserted into and discharged from the housing. On the other hand, on that housing are provide rail guides for guiding the rails thereon, and a lock member for locking the tray, etc., and thereby enabling an ejecting operation of the tray with using an eject button provided on a front bezel.

However, the conventional ejection lock mechanism applied within such the tray-type optical disk apparatus is already disclosed, for example, in the following Patent Document 1, has the structures, including a lock arm and a lock spring, a reset arm and a reset spring, a driving arm and a driving spring, and a solenoid plunger, etc., thereby achieving a small-sized mechanism for enabling the ejection with stability. Also, the similar structures are also disclosed, for example, in the following Patent Document 2, which will be mentioned below. Further, in the following Patent Document 3, which will be mentioned below, there are disclosed the structures of adopting a release arm therein, which are constructed with a plural number of members, for increasing reliability with respect to a lifetime of the ejection lock mechanism mentioned above.

Also, for example, in the following Patent Document 4, in the place of such the structures of three (3) members as was mentioned, there is disclosed the structures of unifying or integrating them into one body, and further in the following Patent Document 5, for example, there is disclosed an attempt of omitting a drive spring therefrom, by forming the lock arm in the ejection lock mechanism with the drive spring into a one (1) body, through the plastic molding.

[Patent Document 1] Japanese Patent Laying-Open No. 2004-303289 (2004);

[Patent Document 2] Japanese Patent Laying-Open No. 2004-234800 (2004);

[Patent Document 3] Japanese Patent Laying-Open No. 2006-120190 (2006);

[Patent Document 4] Japanese Patent Laying-Open No. 2006-190350 (2006); and

[Patent Document 5] Japanese Patent Laying-Open No. Hei 8-235717 (1996).

BRIEF SUMMARY OF THE INVENTION

By the way, in recent years, accompanying with an increase of demands upon a notebook-type personal computer, i.e., being superior in portability thereof, further requirements of thin-sizing and light-weight are made for an optical disk apparatus to be installed within said notebook-type personal computer, and in more details thereof, it is required to thin or slim the thickness of the optical disk apparatus to be about from 12.7 mm to 9.5 mm. On the contrary to this, since there is no change in the thickness of the optical disk to be inserted within that optical disk apparatus or the curve or warp of thereof, etc., therefore it is necessary to thin the thickness of the optical disk apparatus itself. For that purpose, there is a necessity of thinning, in particular, the tray portion thereof.

However, in case when trying to make the ejection lock mechanism further thin, which is made up with three (3) pieces of arm portions, as disclosed in conventional arts mentioned above, in particular, the above-mentioned Patent Documents 1 to 3, although the details of which will be mentioned below, there is a problem brought about, that stability is lost in the ejecting operation in that ejection lock mechanism. Also, with such the structures of building up in one body (as an unit), in the place of the three (3) members, as is disclosed in the Patent Document 4 mentioned above, it is difficult to achieve the functions necessary for the ejection lock mechanism, which is normally built up with those three members. Further, with the Patent Document 5, although there is disclosed a lock arm formed into one body (i.e., as a unit) through plastic molding, however since there is necessity of applying a relatively strong driving force upon such the lock arm, always, therefore it is difficult to form the lock arm into one body (i.e., as a unit) through the plastic molding. Thus, with use thereof for a long term, a driving spring is deformed or broken (i.e., deterioration), and then the necessary functions cannot be obtained for the ejection lock mechanism.

Then, according to the present invention, by taking the problems within such the conventional arts mentioned above into the consideration thereof, in particular, the problem of the ejection lock mechanism within the optical disk drive apparatus accompanying with the thin-sizing thereof, it is an object to provide an ejection lock mechanism being suitable for thin-sizing, with reducing a number of parts for achieving such the mechanism and making the workability thereof easy, as well as, achieving a stability of the ejecting operation, and thereby providing an optical disk drive apparatus, which can be made cheaply, as well as, to be thin in sizes, with adoption of such the ejection lock mechanism.

Further, the present invention is accomplished by finding a problem that, within the structures of the optical disk apparatus disclosed in the Patent Document 1 mentioned above, i.e., the Japanese Patent Laying-Open No. 2004-303289 (2004), which was proposed by the inventors and others same to those of the present invention, in particular, when trying to make the ejection lock mechanism further thin in the sizes thereof, it is difficult to keep the spring strength of the structures, i.e., piling up the reset arm and the torsion spring, and for that reason, the stability is lost in the ejecting operation thereof. And, an improvement is needed on such the structures of piling up the reset arm and the torsion spring, also from a viewpoint of assembling when manufacturing, because both ends of the torsion spring must be set at two (2) pieces of small engagement portions, and therefore it is also accomplished with a new acknowledgement of the necessity of improvements also for the purpose of providing a cheap optical disk apparatus.

And, according to the present invention, for accomplishing the object of the present invention mentioned above, while dissolving the problems above mentioned, the thin-sizing of the ejection lock mechanism can be achieved with adoption of the structures, i.e., providing an elastic portion on a reset arm itself of the ejection lock mechanism, while deleting the torsion spring therefrom.

Namely, according to the present invention, first of all, there is provided an optical disk apparatus, comprising: a housing; a tray being insertable into said housing; a lock member provided on said housing; and an ejection lock mechanism, provided on said tray, for locking when inserting said tray into said housing and for ejecting when carrying out said tray from said housing, wherein said ejection lock mechanism provided on said tray has: a lock arm for locking said tray, being engaged with said lock member provided on said housing; a drive arm, in contact with said lock arm, for moving said lock arm to a position of being engaged with or releasing from engagement with said lock member; a solenoid having a movable plunger to be engaged with said drive arm; and a reset arm for restoring the plunger of said solenoid, further wherein, said reset arm is formed in one body, together with a drive arm portion for moving said drive arm to the position of releasing from engagement with said lock member, through rotation thereof while being in contact with said lock member, when carrying out said tray into an outside of said housing, and an elastic portion for biasing said drive arm portion to a position for restoring the plunger of said solenoid, when carrying said tray into an inside of said housing.

Further, according to the present invention, within the optical disk apparatus, as described in the above, preferably, said elastic portion of said reset arm has "U"-shaped portions, turning round to said reset arm through an upper portion of said drive arm portion, or said reset arm, being constructed with said elastic portion and said drive arm portion, is formed into one body from a plastic.

In more details, the ejection lock mechanism includes three (3) arm portions; i.e., the lock arm for locking said tray, being engaged with the lock member provided on the housing, the drive arm, in contact with the lock arm, for moving the lock arm to a position of being engaged with or releasing from engagement with the lock member, the solenoid having a movable plunger to be engaged with the drive arm, and the reset arm for restoring the plunger of the solenoid, wherein said reset arm is made up with the arm portion and the elastic portion, which are formed in one (1) body (as a unit) from a plastic, etc., and the arm portion has two (2) arm pieces, and wherein a first arm piece has a function for moving the drive arm to the position of releasing from engagement with the lock member, through rotation thereof while being in contact with the lock member, and a second arm piece has a function for restoring the drive arm to a plunger storing portion of the solenoid, with a biasing force of the elastic portion, and the elastic portion has the "U"-shaped portions, turning round to the reset arm through an upper portion of the drive arm, whereby rotation of the first arm piece in contact with the lock member makes a mutual distance between the "U"-shaped portions, so as to maintain stability on the spring biasing force thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
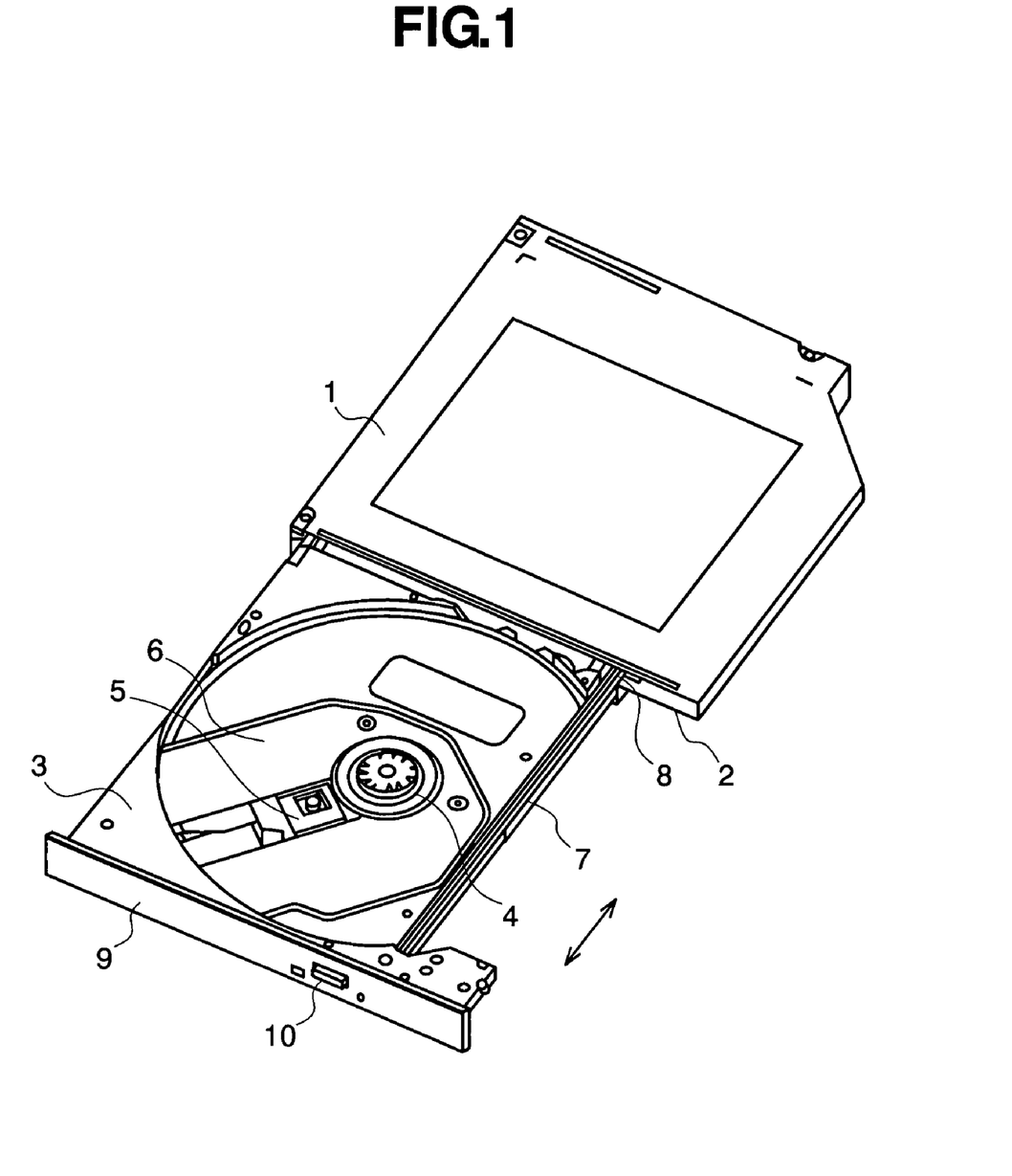
FIG. 1 is a perspective view for showing the entire structures of an optical disk apparatus, according to an embodiment of the present invention, under the condition of ejecting a disk tray thereof.

FIG. 1 attached herewith shows an exterior view of an optical disk apparatus, according to an embodiment of the present invention, and within this FIG. 1, a reference numeral 1 depicts a top case for building up a housing of the apparatus, 2 a bottom case of the same, wherein those top and bottom cases build up a main body of the optical disk apparatus.

On the other hand, a reference numeral 3 in the figure depicts a disk-tray, being attached in a slidable manner (see an arrow in the figure) with respect to the housing of the apparatus mentioned above; i.e., it can be received within an inside of the main body of the apparatus or ejected into an outside thereof. Thus, an optical disk, being loaded or mounted onto a predetermined portion (in the figure, a nearly circular-shaped recessed portion) on that disk tray 3, can be transferred into the main body of the apparatus, or can be transferred from the main body of the apparatus into an outside thereof. Also, on this disk tray 3 are mounted a disk motor 4 for rotationally driving the optical disk loaded, an optical pickup 5 for conducting recording/reading (or reproducing) of signals while irradiating a laser beam upon a recording surface of the optical disk, and an optical disk transmission mechanism 6 for moving the optical pickup 5 into a radial direction of the optical disk. Also, on a side surface of the disk tray 3 slidable to the apparatus housing is provided a guide rail 7 along with the moving direction thereof (see the arrow in the figure), while on the other hand, a rail guide 8 for guiding along the guide rail 7 is provided on a side of the main body of the apparatus (herein, the bottom case 2).

Further, on a front surface (at the lower-left direction in the figure) of the disk tray 3 mentioned above is provided a front bezel 9, on a part of which is attached an eject button 10 for use of an eject operation of the disk tray. However, though not shown herein, but also an ejection lock mechanism, for locking the disk tray 3 at a predetermined insertion portion within an inside of the main body of the apparatus, is disposed at a position near to the eject button 10, on the reverse side surface of that disk tray 3.

And, within the optical disk apparatus having such structures as was mentioned above, for example, in a case when an optical disk is inserted into the main body of the apparatus, for recording or reproducing thereof, the eject button 10 is pushed down. Upon this pushdown of this eject button 10, the above-mentioned ejection lock mechanism starts the operation thereof, so as to release said disk tray 3 from the locking condition onto the main body of the apparatus, and thereby ejecting the disk tray 3 outside, from the main body of the apparatus. Thereafter, the optical disk is set at the predetermined position on the disk tray 3 ejected (in more details thereof, a turn table attached at an upper portion of the disk motor 4, which is shown in the figure, is inserted into an inner hole of the optical disk), and it is inserted into the main body of the apparatus, again. With such loading operation of the disk tray 3, the optical disk can be transferred into the main body of the apparatus. And, the optical disk transferred therein is set at a predetermined position where it can be rotated by the disk motor 4. On the other hand, the disk tray 3 is locked onto the main body of the apparatus, again, by means of the ejection lock mechanism, at the predetermined position separating from the optical disk within the main body of the apparatus.

Figure 2:
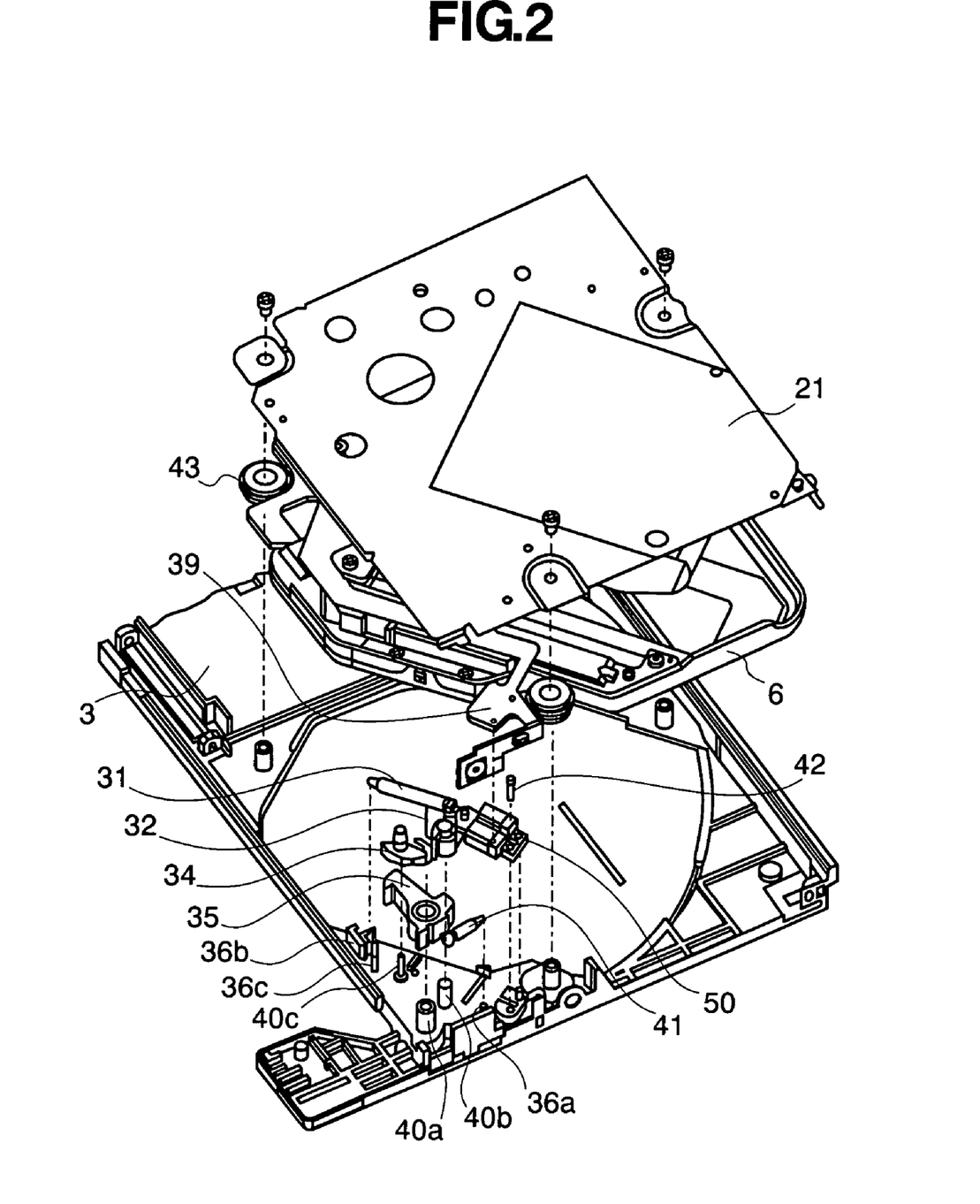
FIG. 2 is an exploded view for showing the details of the disk tray of the optical disk apparatus shown in FIG. 1 mentioned above, in particular, when seeing it from the reverse side surface thereof.

Next, FIG. 2 attached herewith is an exploded perspective view of the optical disk apparatus shown in FIG. 1 mentioned above, in particular, for showing a condition of the structures shown in FIG. 1, seeing it from the reverse side thereof. Thus, in this FIG. 2, the disk cover 3 comprises the optical disk transmission mechanism 6 mentioned above, and further a lower portion thereof is attached with an under cover 21. And, in this disk tray 3 is provided the ejection lock mechanism, around the lower left portion in the figure.

Thus, this ejection lock mechanism comprises a lock arm 35 having an arm portion rotating around a fulcrum and an engagement portion formed thereon, to be locked or engaged with the main body of the apparatus, a drive arm 32 having an arm portion rotating around a fulcrum and an engaging portion formed thereon, to be engaged with the lock arm 35 mentioned above, and a solenoid plunger 50, a movable piece of which is engaged with the drive arm 32 mentioned above. Also, a drive spring 31 is connected to that drive arm 32, and it shifts the position of that drive arm 32, rotationally, in such a direction that a movable piece of the solenoid plunger 50 is separated from a stationary portion of that solenoid plunger 50, and that the drive arm 32 is engaged with the lock arm 35, due to the elastic restoring force thereof, when releasing the lock. Also, a reference numeral 34 depicts a reset arm for pushing back the drive arm 32, being biased by the restoring force of a elastic portion, which will be mentioned later, and thereby turning the disk tray 3 back into the original condition, i.e., being locked onto the main body of the apparatus.

Further, reference numerals 36a, 36b and 36c in the figure depict hooks, respectively, and also, a reference numeral 39 a flexible circuit board, a reference numeral 40a a boss for forming the rotation fulcrum of the lock arm 35, a 40b a boss for forming the rotation fulcrum of the drive arm 32, 40c a boss for forming the rotation fulcrum of the reset arm, a reference numeral 41 a lock spring for applying the biasing force onto the lock arm 35, to be engaged with the main body of the apparatus (i.e., a boss portion on the rail guide), a reference numeral 42 a screw for attaching the solenoid plunger 50, and a reference numeral 43 a dumper rubber, respectively. However, with such structures as mentioned above, the drive spring 31, the drive arm 32, the solenoid plunger 50, and the lock arm build up a principle portion of the ejection lock mechanism.

Figure 10:
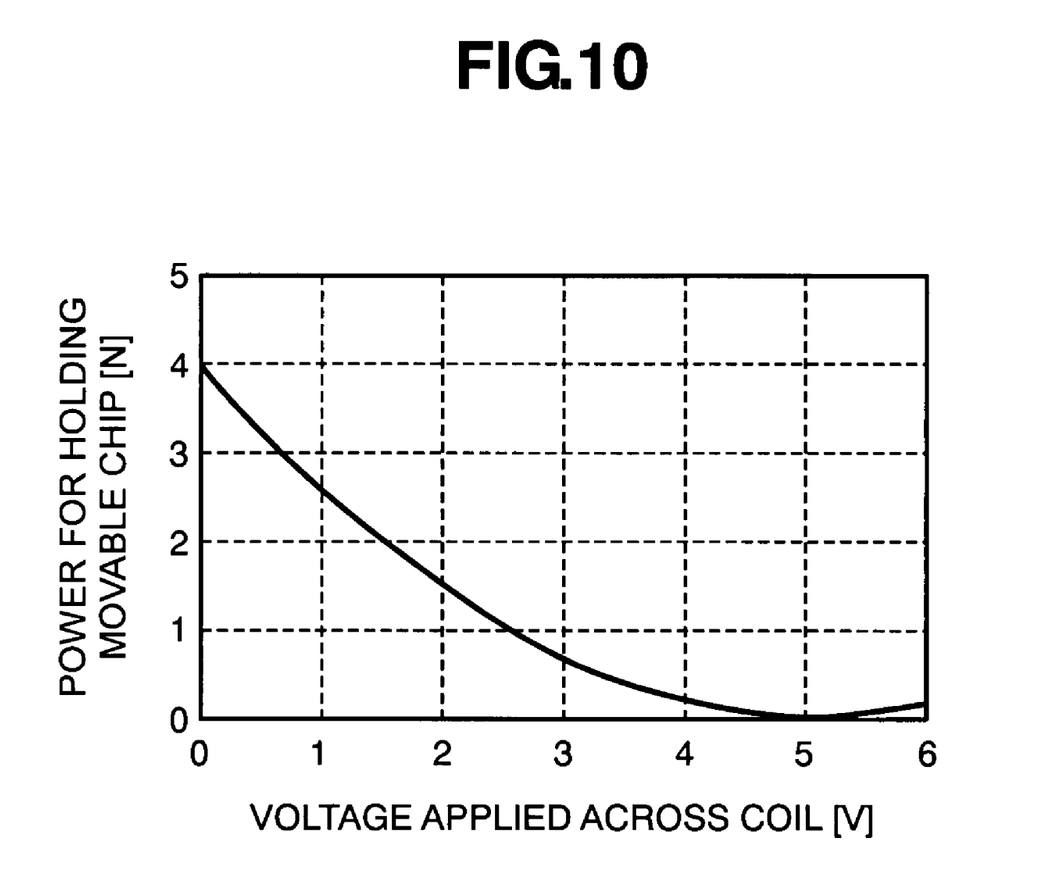
FIG. 10 is a view for showing an example of characteristics of a solenoid plunger, within the ejection lock mechanism of the optical disk apparatus mentioned above.

Next, explanation will be made on the operations of the ejection lock mechanism, the structures of which are explained by referring to FIG. 2 mentioned above, first of all, when the ejection button 10 shown in FIG. 1 is pushed down, voltage is applied across a coil of the solenoid plunger 50 through the flexible circuit board 39, and thereby weakening or reducing the electromagnetic suction force onto the movable piece. An example of the characteristics of the power or force for holding the movable piece (i.e., suction force), with respect to the voltage applied across the coil of the solenoid plunger 50, is shown in FIG. 10 attached herewith. Thus, on a plunger of the solenoid plunger 50, the movable piece thereof is sucked onto the stationary portion of a yoke, by a force of about 4N being larger than the restoring force of the drive spring 31, through a magnet, under a condition where no voltage is applied across the coil (=no current flows in the coil). Then, when current is supplied while voltage is applied across the coil, a magnetic field is formed by the current, opposing to that of that magnet in the polarization thereof, so as to reduce the suction force onto the movable piece, and as a result thereof, it goes down to a small value, sufficiently smaller than the restoring force of the drive spring 31. However, under such condition, the drive spring shifts the position of the drive arm 32, rotationally, due to the restoring force thereof. This drive arm 32 separates the movable piece of the solenoid plunger 50 from the stationary portion, through that rotational shifting of the position. And, due to this separation, the electromagnetic suction force is reduced, abruptly, between that movable piece and the stationary portion, within the solenoid plunger 50. Thus, under such the condition of separation, the drive arm 32 comes in contact with the lock arm 35, and it shifts the opposition of that lock arm 35, rotationally. And, with such rotational shifting of position, the lock arm 35 mentioned above is released from the locking condition onto the main body of the apparatus, and thereby bringing that disk tray to be ejected from the main body of the apparatus.

Figure 3:
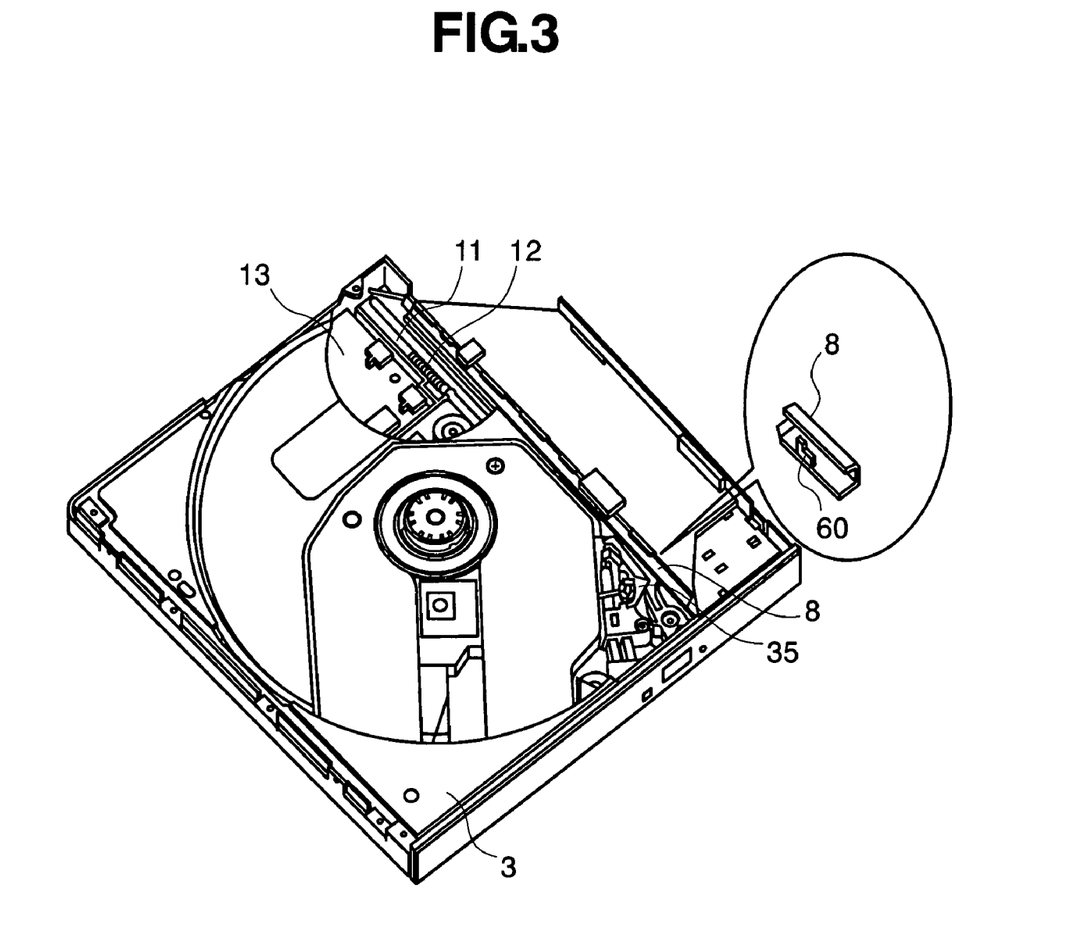
FIG. 3 is a perspective view of the entire structures of the optical disk apparatus shown in FIG. 1 mentioned above, being partially exploded, under the condition of receiving the disk tray into an inside.

Following to the above, FIG. 3 attached herewith shows, on particular, an eject lever and peripheral structures thereof, within the optical disk apparatus shown in FIG. 1 mentioned above. In this FIG. 3, a reference numeral 11 depicts the eject lever for shifting the disk tray into the eject position thereof, and a reference numeral 12 depicts an eject spring for pushing the disk tray 3 due to the restoring force thereof, into an ejecting direction through the eject lever 11. Also, within this figure, a circuit board is depicted by a reference numeral 13, and further there is shown the lock arm 35 together with the rail guide 8. And, on the right-hand side of this FIG. 3, there is shown an enlarged structures of a picked-up portion of that rail guide 8, and as is apparent from this figure, on this rail guide (i.e., the main body) is provided a boss portion (i.e., a lock member) 60 for locking the hook-like engagement portion of the lock arm 35 thereon. However, this boss portion (or, the lock member) 60 may be formed other than that, for example, implanting a screw or a pin, etc., at the predetermined position on the rail guide 8.

However, in the structures shown in FIG. 3 mentioned above, when the lock arm 35 is shifted in the position, rotationally, so that the hook-like engagement portion thereof comes off from the boss portion 60, and thereby when the disk tray 3 is released from the locking condition onto the main body of the apparatus, then the eject spring 12 pushes the disk tray 3 into the ejecting direction through the eject lever 11. With doing this, the disk tray 3 moves under the condition of being guided with the rail 7 thereof (see FIG. 1) by means of the guide rail 8, and thereby it is ejected.

As was mentioned above, according to the present invention, principally, within the ejection lock mechanism of the optical disk apparatus, in case of ejecting the disk tray, the drive arm is shifted in the position, rotationally, due to the elastic restoring force of the drive spring, when excitation current flows into the solenoid plunger upon the ejecting operation, so as to firstly separate the movable portion of the solenoid plunger from the stationary portion thereof, and after the separation, the lock arm is shifted in the position, rotationally, so as to release the engagement with the main body of the apparatus.

Next, explanation will be made on further detailed structures thereof, in particular, relating to the ejection lock mechanism of the optical disk apparatus, the structures of which was already explained in the above, by referring to FIGS. 4 to 9.

Figure 4:
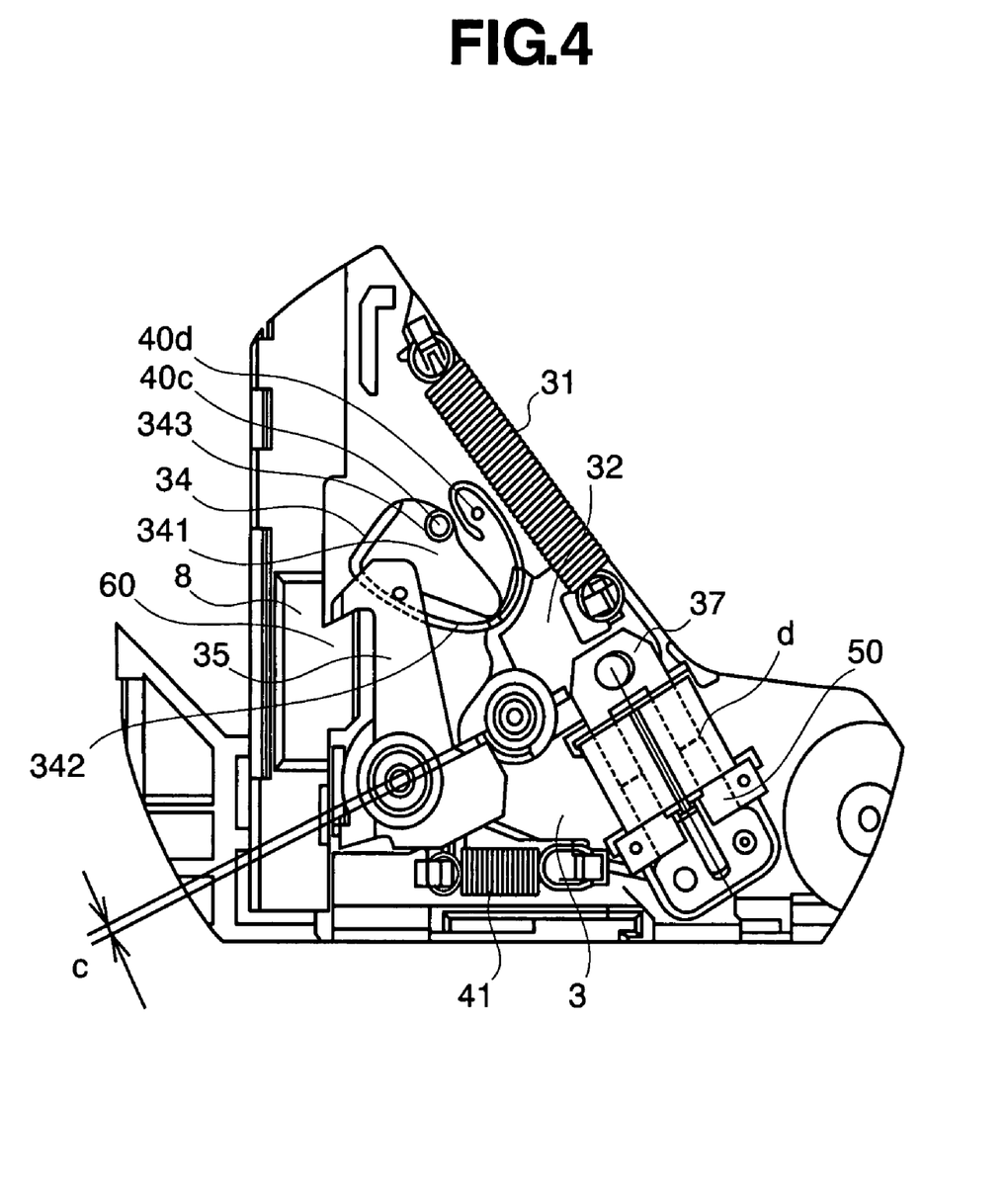
FIG. 4 is a partial enlarged view for showing the condition where the disk tray is locked, within an ejection lock mechanism of the optical disk apparatus mentioned above.

First of all, FIG. 4 attached herewith shows the condition where the disk tray 3 is locked onto the main body of the apparatus. In this FIG. 4, the disk tray 3 locks the lock arm 35 thereof onto the boss portion (or, the lock member) 60, which is provided on the rail guide 8 provided on the main body of the apparatus. In this figure, also the reference numeral 31 depicts the drive spring, the reference numeral 32 the drive arm, and the reference numeral 34 the reset arm, respectively; however, in particular, an example of the detailed structures of this reset arm 34 are shown in FIG. 5 attached herewith.

Figure 5:
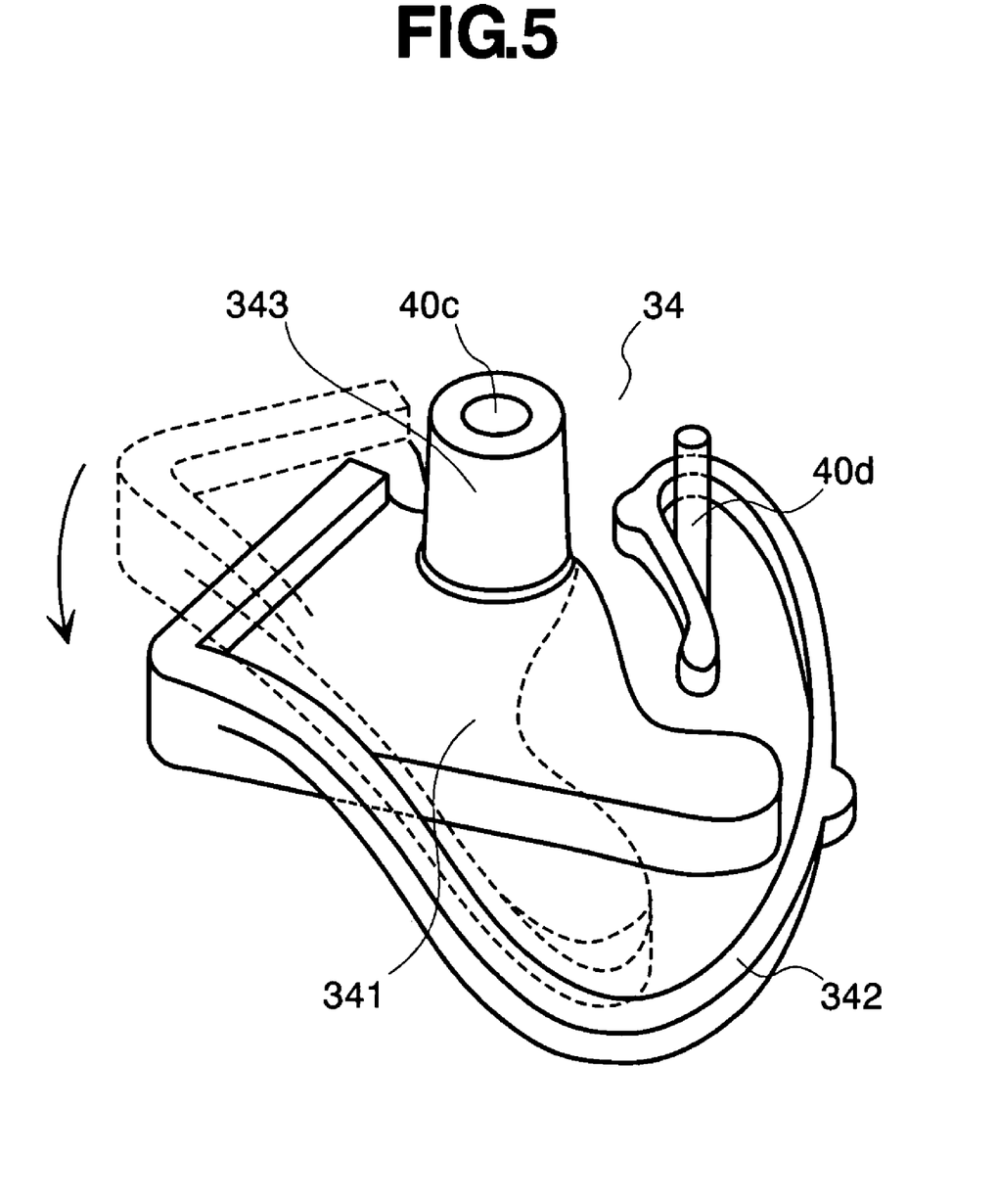
FIG. 5 is a perspective view for showing an example of the detailed structure of a reset arm, within the ejection lock mechanism of the optical disk apparatus mentioned above.

Thus, as apparent from this FIG. 5, this reset arm 34 has a drive arm portion 341, being about triangle in the outer configuration, and a curved portion (i.e., "U"-shaped elastic portions) 342, which is wound round to the reset arm through an upper portion of that drive arm portion 341. However, the drive arm portion 341 is formed with a rotation support hole 343 in a part thereof, to be inserted with the boss 40c, which is formed on the disk tray 3, and into a looped portion at the tip of that curved portion 342 is also inserted the boss 40d, which is formed on the disk tray 3. However, this reset arm 34, i.e., the drive arm portion 341 and the curved portion 342, etc., are made of a plastic material having elasticity, such as, POM (polyacetal), for example, into a one body (as a unit) together with the drive arm portion 341, through the injection molding, etc.

However, with the reset arm 34 having such structures, as is shown by broken lines in the figure, the spring biasing force can be maintained with respect to the drive arm portion 341, in the structures thereof, by narrowing the mutual distance between the "U"-shaped portions of that curved portion (i.e., the "U"-shaped elastic portions) 342, even if the drive arm portion 341 shifts (or rotate) the position thereof. Thus, onto the curved portion (i.e., the "U"-shaped elastic portions) 342, will not always applied tension or the like, and for that reason, no deformation or damaging is caused due to the using thereof for a long time-period. In addition thereto, with such the structures of the reset arm 34 mentioned above, since it is enough to insert the boss 40c implanted on the tray into the rotation support hole 343 of that drive arm 341 while disposing the boss 40d at the position within the loop at the tip of that curved portion (i.e., the "U"-shaped elastic portions) 342, and therefore it is possible to make the assembling work thereof easy, comparing to the structures of piling up the reset arm and the torsion spring each other, according to the conventional arts.

Herein, turning back to FIG. 4, again, the other reference numerals 35, 50 and 37 in the figure also depict the lock arm, the solenoid plunger, and the movable piece of the solenoid plunger, respectively, and also the reference numeral 41 in the figure depicts the lock spring, and further a mark "c" represents a gap between the drive arm 32 and the lock arm 35, and a mark "d" a suction portion between the movable piece 37 and the stationary portion within the solenoid plunger 50.

Under the condition shown in FIG. 4 (i.e., locking condition), i.e., no current flows within the coil within the solenoid plunger 50, the movable piece 37 is sucked onto the stationary portion due to the suction force of the magnet. In more details thereof, a part of the drive arm 32 is engaged with that movable piece 37, and to that drive arm 32 is connected the drive spring 31. And, an engagement portion (a second engagement portion) of the drive arm 32 is separated from only by the gap "c", with respect to the lock arm 35, i.e., non-contacting condition. In such the condition, the restoring force of the drive spring 31 is smaller than the suction force on the movable piece 37 towards the stationary portion within the solenoid plunger 50, therefore the drive arm 32 will not shift the position thereof rotationally, by means of the drive spring 31, thereby still keeping that gap "c" between the lock arm 35. Also, in this condition, the lock arm 35, in particular, the hook-like engagement portion (i.e., the first engagement portion) at the tip thereof is engaged with the boss portion (or, the lock member) 60 of the rail guide 8, which is provided in the main body of the apparatus, and thereby locking the disk tray onto the main body of the apparatus.

Figure 6:
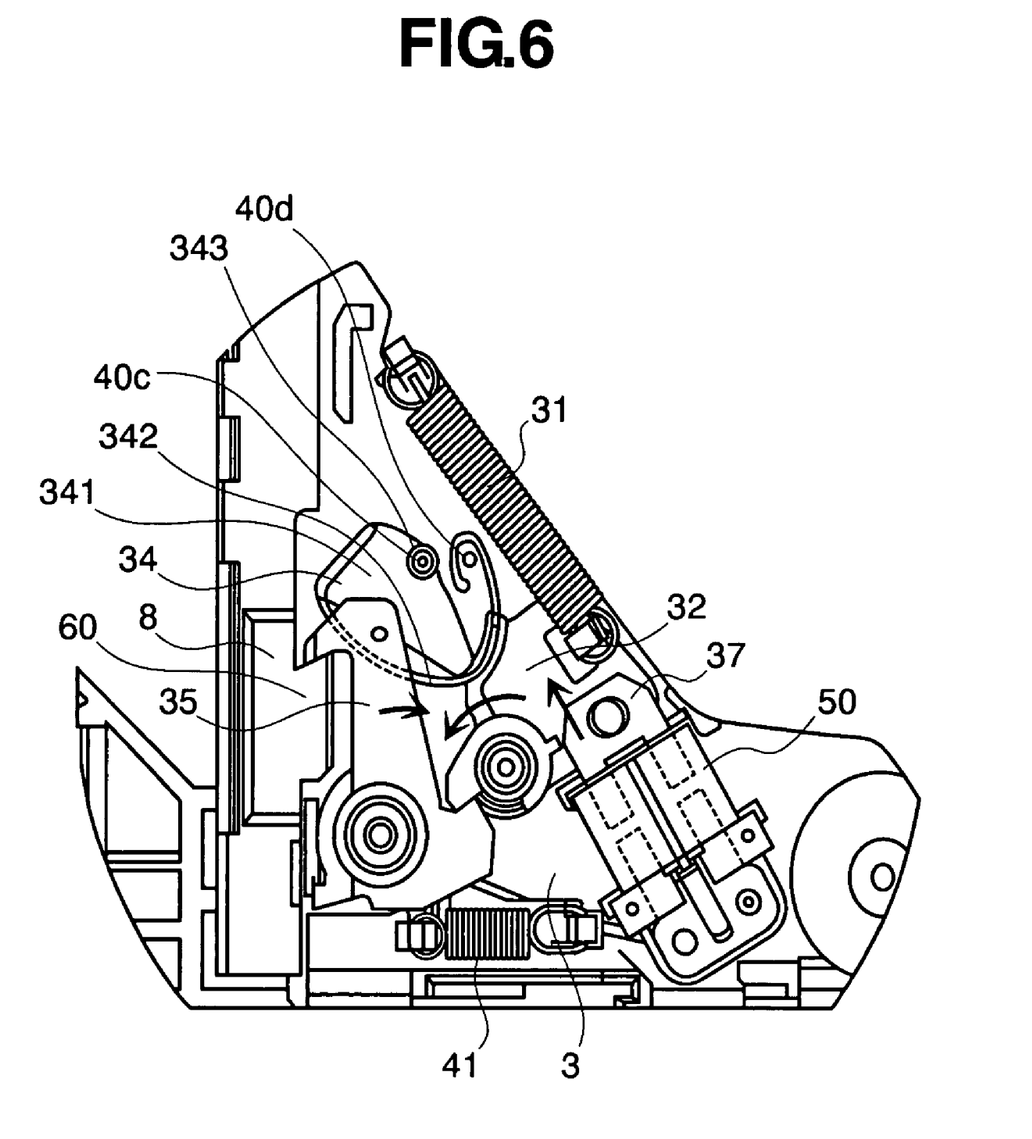
FIG. 6 is a partial enlarged view for showing the condition on a way when the disk tray comes off from the locking condition, within the ejection lock mechanism of the optical disk apparatus mentioned above.

Next, FIG. 6 attached herewith shows the condition when voltage is applied across the coil of the solenoid plunger 50, so as to pull up the movable piece 37 by the restoring force of the drive arm 31, through the drive arm 32, thereby separating the movable piece 37 from the stationary portion thereof.

Thus, when the eject button 10 shown in FIG. 1 is pushed down, i.e., current is supplied therein while applying the voltage across the coil of the solenoid plunger 50, then the suction force is reduced on the movable piece 37 towards the stationary portion, so that it goes down to the value, being sufficiently smaller than the restoring force of the drive spring 31. As a result of that, the drive arm 32 is shifted in the position, rotationally, due to the restoring force of the drive spring (see an arrow in the figure), and thereby separating the movable piece 37 of the solenoid plunger 50 from the stationary portion. Due to this separation is reduced, abruptly, the electromagnetic suction force on that movable piece 37, between the stationary portion. And, under the condition where the electromagnetic suction force is reduced, and the said movable piece 37 is separated from the stationary portion, the drive arm 32 starts contacting on the lock arm 35, at the engagement portion thereof (i.e., the second engagement portion), and further through shifting the position there rotationally, it shifts the position of the lock arm 35, on which the drive arm 32 contacts (see an arrow in the figure). Namely, the drive arm 32, after separating the movable piece 37, contacts on the lock arm 35, at the second engagement portion thereof, and thereafter it further shift the position rotationally, thereby to shift the position of the lock arm 35, rotationally. And, due to the rotational shifting of that lock arm 32, also the hook-like engagement portion (i.e., the first engagement portion), which is formed at the tip portion of the lock arm 35, and thereby reducing or lowering the engagement between the boss portion (or, the lock member) 60 of the rail guide 8.

Figure 7:
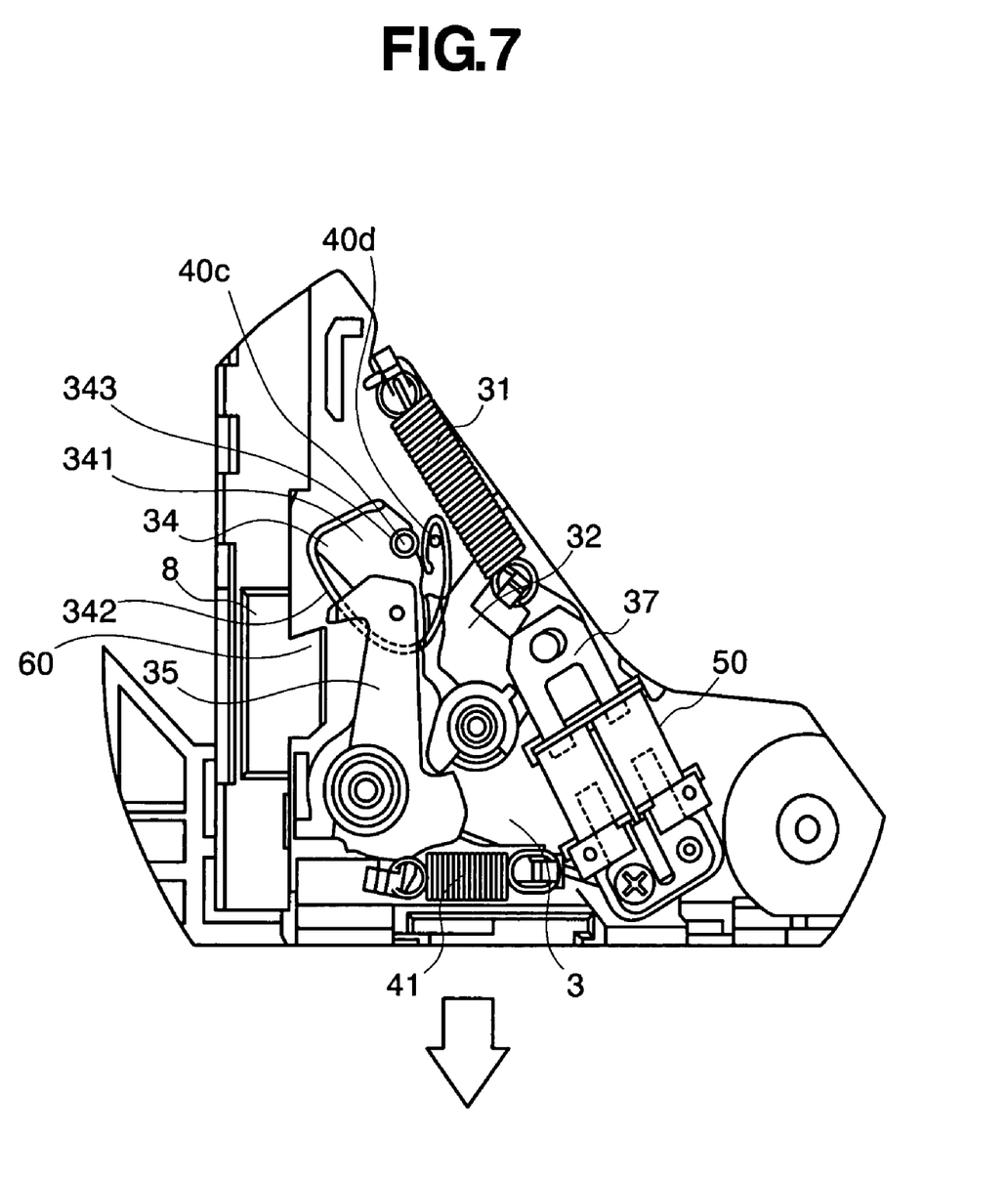
FIG. 7 is a partial enlarged view for showing the condition where the disk tray comes off from the locking condition, within the ejection lock mechanism of the optical disk apparatus mentioned above.

FIG. 7 attached herewith is a view for showing the condition when the disk tray is released from the lock thereon, as a result of rotational shifting of the lock arm 35 because the drive arm 32 further shifts the position thereof rotationally, due to the restoring force of the drive spring 31, from the condition shown in FIG. 6 mentioned above.

Thus, when the drive arm 32 further shifts the position thereof rotationally, from the condition shown in FIG. 6 mentioned above, the movable piece 37 of the solenoid plunger 50 is separated at the position further far from the stationary portion, and then the suction force comes to be much smaller, between the stationary portion. Under such condition, that drive arm 32 further shifts the lock arm 35 in the position thereof, rotationally. And, due to the rotational shifting of that lock arm 35, the hook-like engagement portion (i.e., the first engagement portion), which is formed at the tip portion of the lock arm 35, shifts the position thereof, so that it is released from the engagement between the boss portion (or, the lock member) 60, then it is in the condition shown in FIG. 7.

And, when the engagement portion of the lock arm 35 comes off from the boss portion (or, the lock member) 60, then the disk tray 3 is released from the locking condition onto the main body of the apparatus, and the eject spring 12 (see FIG. 3) pushes the disk tray 3 into the direction for ejection thereof, through the eject lever 11 (see FIG. 3). As a result thereof, the disk tray 3 moves while being guided at the rail 7 thereof on the rail guide 8, and thereby it is ejected (see an arrow in the figure).

Figure 8:
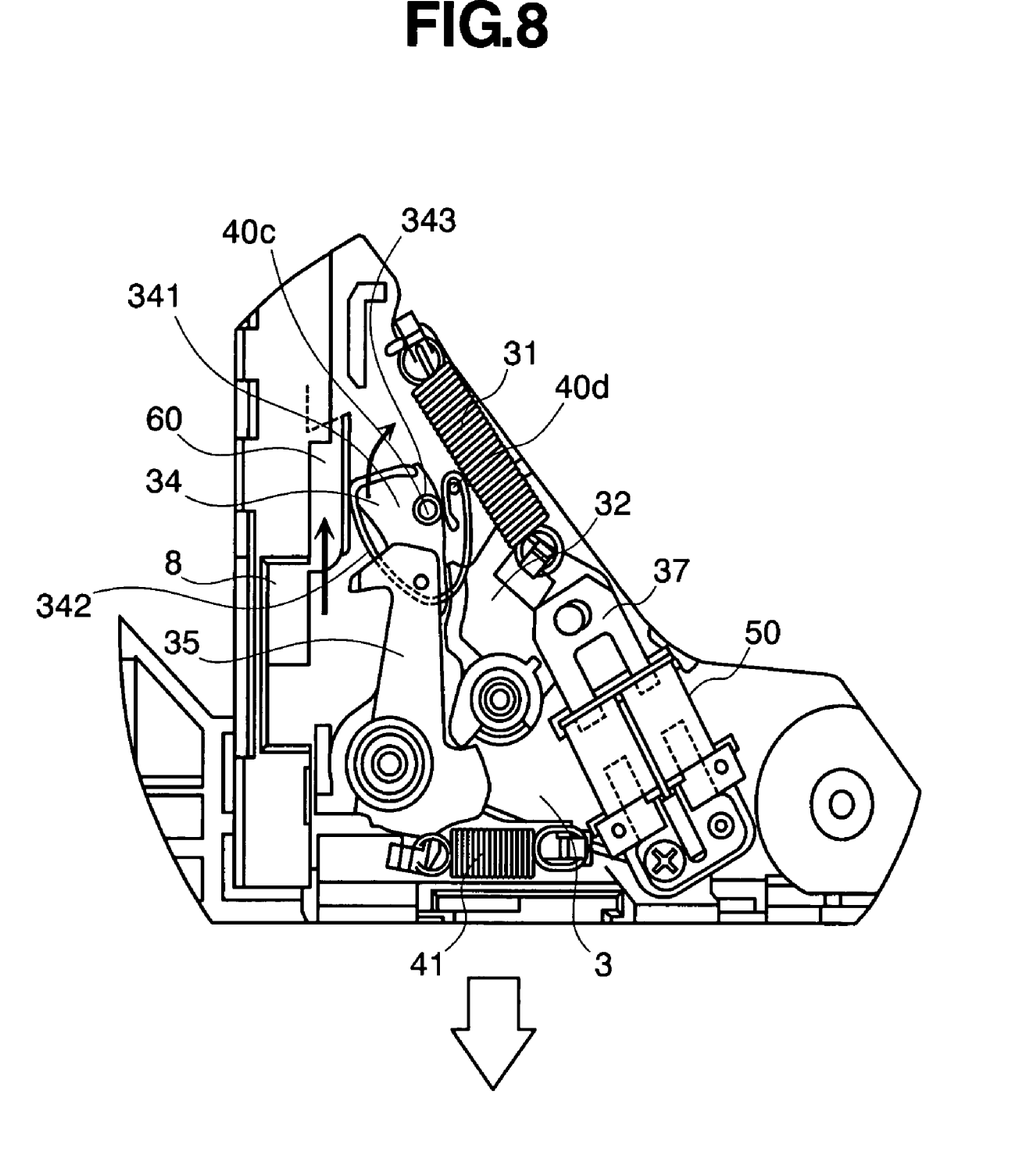
FIG. 8 is a partial enlarged view for showing the condition where the disk tray moves, after the disk tray comes off from the locking condition, within the ejection lock mechanism of the optical disk apparatus mentioned above.

As a result of the above, i.e., when the disk tray 3 is ejected, as is shown by the arrow in FIG. 7 mentioned above, then the boss portion (or, the lock member) 60 of the rail guide 8 moves, as is shown in FIG. 8 attached, into the direction shown by the arrow in the figure, in relative to the disk tray 3. And, due to this movement thereof, the boss portion (or, the lock member) 60 comes in contact with a tip portion of the drive arm portion 341 of the reset arm 34, and thereby rotates that drive arm portion 341 into the direction of an arrow, around the boss 40*d*. In this instance, the reset arm 34 is pulled up at the curved portion (i.e., the "U"-shaped portions) 342 thereof.

Figure 9:
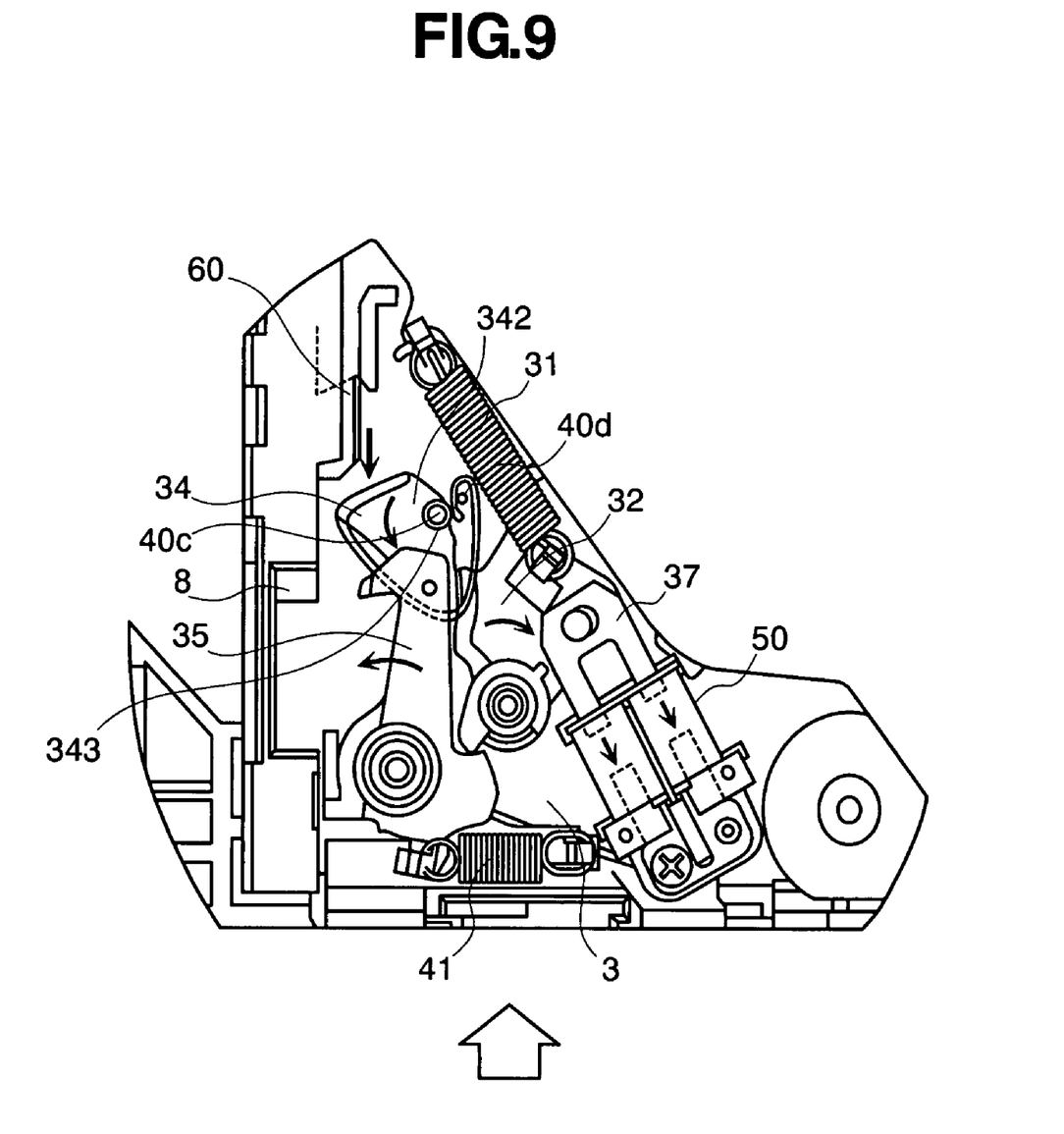
FIG. 9 is a partial enlarged view for showing the condition where the disk tray is inserted into, again, after the disk tray comes off from the locking condition, within the ejection lock mechanism of the optical disk apparatus mentioned above.

Thereafter, when the boss portion (or, the lock member) 60 of the rail guide 8 further moves into the direction of the arrow shown in FIG. 8, then the tip portion of the drive arm portion 341 of the reset arm 34 is released from contacting with the boss portion (or, the lock member) 60, as is shown in FIG. 9. However, in this instance, the drive arm portion 341 of the reset arm 34, while being pushed by the rotated boss portion (or, the lock member) 60, rotates around (see an arrow in FIG. 8), once, thereby pulling back the tip portion thereof into the right-hand direction in the figure, as shown in FIG. 8 mentioned above, but thereafter, due to the elasticity of that curved portion (i.e., the "U"-shaped portions) 342, the drive arm portion 341 of the reset arm 34 is turned back the predetermined position; thus, when transferring the tray 3 into the main body, the drive arm portion 341 is biased into such position for restoring the plunger of the solenoid, by rotationally driving the drive arm 32 into the original direction.

Namely, as is apparent from FIG. 9, thereafter, at the tip portion of the drive arm portion 341 of the reset arm 34 contacts the reverse side surface of the boss portion (or, the lock member) 60 of the rail guide 8, with certainty, when the disk tray 3 is moved, again, to be transferred into the main body (i.e., the case 1 and 2) of the apparatus (see the arrow in the figure), and thereby rotating the drive arm portion 341 of the reset arm 34 rotates into the direction of the arrow. Thus, as is apparent from the figure, rotation of this drive arm portion 341 of the reset arm 34 rotates the drive arm 32 into the direction of the arrow, and thereby pushing back the movable piece 37 of the solenoid plunger 50 into the original position (i.e., in contact with the stationary portion thereof), and at the same time, turning the lock arm 35 back to the original position due to the function of the lock spring 41 thereof. With doing this, the ejection lock mechanism of the optical disk apparatus turns back, again, into the condition shown in FIG. 4 mentioned above.

Thus, as was mentioned above, with functions of the reset arm 34 having the drive arm portion 341 and the curved portion (i.e., the "U"-shaped elastic portions) 342, which is wound round to the reset arm through the upper portion of that drive arm portion 341, being formed into one body (as a unit), as is shown by the broken lines shown in FIG. 5 mentioned above, even if the drive arm portion 341 is rotated by the boss portion (or, the lock member) 60 of the rail guide 8, thereafter, it is possible to restore (or bias) the drive arm portion 341 at the predetermined position (i.e., the position enabling to turn back the drive arm 32, when transferring the tray 3 into the main body), due to the functions of the curved portion (i.e., the "U"-shaped elastic portions) 342 thereof. With this, even in the condition where the disk tray 3 is transferred into an outside of the main body (the cases 1 and 2) of the apparatus while releasing the ejection lock mechanism from the locking condition, it is possible to turn the ejection lock mechanism into the original locking condition, with certainty, when transferring the disk tray 3, thereafter, into the main body of the apparatus, only by attaching the reset arm 34 formed in one body (as a unit), but without adopting such the structures of piling up the torsion spring on the reset arm, as was mentioned in the conventional arts. Also, in that instance, in particular, with the structure of forming the drive arm portion 341 and the curved portion (i.e., the "U"-shaped elastic portions) 342 into one body (as a unit), in the place of the conventional structures of piling up the torsion spring, it is possible to makes sounds generated when locking the tray comfortable while dissolving or removing uncomfortable sounds generated due to flicking sounds of a metal when locking the tray, with the conventional ejection lock mechanism, and therefore it is possible to achieve a comfortable operability for the optical disk apparatus.

Also, according to the embodiment of the present invention mentioned above, within the optical disk apparatus, in addition to the above-mentioned effects, in particular, in case when conducting the ejecting operation of the disk tray 3, (a) since the lock arm 35 is not in contact with the drive arm 32 when separating the movable piece 37 of the solenoid plunger 50, then the lock arm 35 does not constitute the load upon the drive arm 32 and the drive spring 31. For this reason, since the drive arm 32 and the drive spring 31 can separate the movable piece 37 from the stationary portion by only taking that movable piece 37 as the load thereof, it is possible to shift the position of the drive arm 32, rotationally, separating that movable piece 37 from the stationary portion with certainty, even though the suction force is increased, applied on the movable piece 37 towards the stationary portion, caused due to variations on parts characteristics when producing and/or changes of condition of an environment where it is used, etc. (b) Also, the rotationally shift of the lock arm through the drive arm 32 is done after the above-mentioned movable piece 37 of the solenoid plunger 50 is separated from the stationary portion, in the structures thereof, therefore the rotational shift of that lock arm is conducted through the drive arm 32 under the condition that the suction force on the movable piece 37 towards the stationary portion comes to be sufficiently small, comparing to the restoring force of the drive spring 31. For this reason, after the separation of the movable piece 37, a large part of the restoring force of the drive spring 31 can be used for the purpose of the rotational shift of the lock arm 35 through the drive arm 32; therefore, it is possible to achieve the rotational shift of the said lock arm 35, with certainty. Accordingly, upon basis of the (a) and (b), a reliable or certain ejecting operation can be achieved with the present embodiment.

However, with the embodiment mentioned above, though the explanation was made on the structures, under the condition that the movable piece 37 of the solenoid plunger 50 is sucked onto the stationary portion, there is provided the gap between the drive arm 32 and the lock arm 35, and under such the sucking condition, the drive arm is not in contact with the lock arm 35, however the present invention should not be restricted only to that. Thus, in that structures, it is enough the restoring force of the drive spring 31 is transmitted to the lock arm 35 through the drive arm 32, after the movable piece 37 is separated from the stationary portion.

With the ejection lock mechanism, according to the present invention, it is possible to achieve a stable ejection operation even if the optical disk apparatus is thin-sized, and also to reduce the costs, through deletion of a number of parts, as well as, deletion of works for engaging the torsion spring, which takes time. Also, a comfortable operability can be achieved, with removing uncomfortable sounds, which is generated when locking the tray with the conventional ejection lock mechanism.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. An optical disk apparatus, comprising:
    a housing;
    a tray being insertable into said housing;
    a lock member provided on said housing; and
    an ejection lock mechanism, provided on said tray, for locking when inserting said tray into said housing and for ejecting when carrying out said tray from said housing, wherein
    said ejection lock mechanism provided on said tray comprises:
        a lock arm for locking said tray by way of engagement with said lock member provided on said housing;
        a drive arm, in contact with said lock arm, for moving said lock arm to a position of being engaged with or disengaged from said lock member;
        a solenoid having a movable plunger engaged with said drive arm; and
        a reset arm for restoring the movable plunger of said solenoid, further wherein,
        said reset arm consists of a single member having a drive arm portion and an elastic portion,
        wherein during movement of the tray to an outside of the housing, the elastic portion biases the drive arm portion to a predetermined position after the drive arm portion separates from the lock member,
        wherein during movement of the tray to an inside of the housing, the drive arm portion rotates from the predetermined position in a direction that causes the drive arm to rotate away from the lock arm to allow the lock arm to reengage with the lock member, and to restore the movable plunger in the solenoid.

2. The optical disk apparatus, as described in the claim 1, wherein said elastic portion of said reset arm has "U"-shaped portions, turning round to said reset arm through an upper portion of said drive arm portion.

3. The optical disk apparatus, as described in the claim 1, wherein said reset arm, being constructed with said elastic portion and said drive arm portion, is formed into one body from a plastic.

* * * * *